JOHN HARRIGAN, OF EAST BOSTON, MASSACHUSETTS.

Letters Patent No. 70,838, dated November 12, 1867.

IMPROVED MEDICAL COMPOUND.

*The Schedule referred to in these Letters Patent and making part of the same.*

TO ALL WHOM IT MAY CONCERN:

Be it known that I, JOHN HARRIGAN, of East Boston, in the county of Suffolk, and State of Massachusetts, have invented an improved Mixture for the Cure of Piles; and I do hereby declare that the following is a full, clear, and exact description thereof.

The nature of my invention consists in combination, in certain portions, of several simples, so as to produce a new and valuable medicine.

To enable others skilled in the art to compound and use my invention, I will proceed to give the recipe for its composition, which is as follows:

Sulphur, one ounce; cream of tartar, one ounce; nitre, fifteen grains; ipecac, thirty grains; black pepper, sixty grains; all to be thoroughly mixed in one pint of simple sirup. Dose for an adult, about two tablespoonfuls morning and evening.

I am aware that mixtures similar to the above, except that there is no ipecac in them, are in common use, but the addition of the ipecac increases the value of the medicine very much, and makes it the best-known cure for the piles.

Having thus described the composition and use of my invention, I will proceed to set forth my claim.

What I claim as my invention, and desire to secure by Letters Patent of the United States, is—

The above-described medicine, compounded as described and for the purpose set forth.

JOHN HARRIGAN.

Witnesses:
    FRANK G. PARKER,
    GUSTAVUS GROEGER.